(12) United States Patent
Ickman et al.

(10) Patent No.: US 11,468,122 B2
(45) Date of Patent: Oct. 11, 2022

(54) SHARED MEMORY SPACE MANAGEMENT FOR CONVERSATIONAL ARTIFICIAL INTELLIGENCE SYSTEM

(71) Applicant: Microsoft Technology Licensing, LLC, Redmond, WA (US)

(72) Inventors: Steven Wayne Ickman, Snoqualmie, WA (US); Thomas Matthew Laird-McConnell, Kirkland, WA (US); Christopher Clayton McConnell, Redmond, WA (US); Carlos Castro, Redmond, WA (US); Christopher Lee Mullins, Sammamish, WA (US); Scott J. Gellock, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 389 days.

(21) Appl. No.: 16/437,777

(22) Filed: Jun. 11, 2019

(65) Prior Publication Data

US 2020/0394227 A1    Dec. 17, 2020

(51) Int. Cl.
| | | |
|---|---|---|
| *H04L 12/00* | (2006.01) | |
| *G06F 16/9032* | (2019.01) | |
| *G06N 5/04* | (2006.01) | |
| *G06F 12/123* | (2016.01) | |
| *G06F 16/11* | (2019.01) | |
| *H04L 51/02* | (2022.01) | |

(52) U.S. Cl.
CPC ...... *G06F 16/90332* (2019.01); *G06F 12/123* (2013.01); *G06F 16/125* (2019.01); *G06N 5/043* (2013.01); *H04L 51/02* (2013.01)

(58) Field of Classification Search
CPC ............. G06F 16/90332; G06F 12/123; G06F 16/125; G06F 51/02; G06N 5/043; G06N 5/045
USPC ............... 706/45; 707/812; 709/212–216, 45
See application file for complete search history.

(56) References Cited

U.S. PATENT DOCUMENTS

| | | | |
|---|---|---|---|
| 8,489,838 B2 * | 7/2013 | Song | H04L 67/125 711/166 |
| 9,012,952 B2 * | 4/2015 | Seo | H01L 33/385 257/99 |
| 9,311,298 B2 * | 4/2016 | Sarikaya | G06F 40/35 |
| 9,430,405 B2 * | 8/2016 | McMullen | G06F 21/6218 |
| 10,275,312 B1 * | 4/2019 | Barhate | G06F 11/1088 |
| 10,509,708 B2 * | 12/2019 | Xiang | G06F 11/2094 |
| 10,949,303 B2 * | 3/2021 | Kohli | G06F 3/0659 |
| 10,992,426 B2 * | 4/2021 | Chen | H04B 17/336 |
| 2019/0188386 A1 * | 6/2019 | Pogorelik | G06F 21/79 |

* cited by examiner

*Primary Examiner* — Frantz Coby
(74) *Attorney, Agent, or Firm* — Holzer Patel Drennan (57) ABSTRACT

A method for utilizing shared memory spaces for data lifecycle management in a conversational AI system includes receiving one or more storage requests directing conversational data to multiple nodes of a conversational data object and storing the conversational data that is directed to each different one of the multiple nodes within a different one of multiple discrete memory spaces. Each of the multiple discrete memory spaces is governed by a scope policy defining a lifetime for data stored within the memory space. The method further provides for erasing data of each node of the multiple different nodes of the conversational data object according to the lifetime defined by the scope policy governing the memory space storing the node.

14 Claims, 5 Drawing Sheets

SHARED MEMORY SPACE MANAGEMENT FOR CONVERSATIONAL ARTIFICIAL INTELLIGENCE SYSTEM

BACKGROUND

A conversational artificial intelligence (AI) platform is a computer program or artificial intelligence system designed to simulate human conversation via auditory or written methods. Bot services such as Azure Bot Service available from Microsoft Corporation provide tools to build, test, deploy, and manage intelligent bots. Software Development Kits made available through such bot services provide developers with tools, templates, and artificial intelligence (AI) services for the creation of bots that use speech, understand natural language, handle questions and answers, and provide other communication-based services.

A few example popular bots include Microsoft's Cortana, Google Assistant, and Amazon's Alexa. To expand capabilities of these bots, third-party developers may create supplemental bots (sometimes referred to as "skills") that are designed to provide the primary bot with a specific skill or function. For example, a third-party developer may design a pizza-ordering bot that allows a user to ask the Amazon voice assistant (Alexa) to order a pizza. The user may invoke this skill by saying, for example, "Alexa, tell Pizza Hut® to place an order." When these bots are developed with existing conversational AI frameworks, different bots are unable to easily share information with one another. Consequently, most conversational systems today are incapable of managing conversations where the user bounces around between different topics (frames).

SUMMARY

A conversational artificial intelligence (AI) system includes a bot service that provides various third-party bots with uniform access to shared memory spaces where data may be stored and mutually accessed by the third-party bots during a conversation with a user conducted through a user device. According to one implementation, the bot service stores conversational data received from one or more third-party bots in association with multiple nodes of a conversational data object. Each different one of the multiple nodes is stored in different one of multiple discrete memory spaces associated with a different scope policy defining a lifetime for conversational data stored within the memory space. The bot service selectively erases data of each node of the multiple nodes of the conversational data object according to the lifetime defined by the scope policy governing the memory space storing the node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

In existing conversational AI systems, different bots typically maintain separate databases and tables even when those bots are designed to communicate with a same user device and/or work together to provide different functional aspects of the same conversational AI platform. For example, Amazon's popular voice assistant "Alexa" is a bot and several third-party developers have created "skills" (e.g., supplemental bots) designed to talk to Alexa to provide the voice assistant with additional skills. If one of these "skills" needs to utilize an entity that is defined within a database table managed by a the Alexa bot, the skill may query the Alexa bot to "pass" the entity when the skill is launched. Alternatively, if a developer of the skill knows the exact database utilized by the Alexa bot to desired requested information, the developer may write code that allows the skill to make a direct call to that database. However, external database information is frequently unknown to a bot developer and/or may entail coding of complex queries. Upon receipt of the requested value (e.g., by either of these methods), a receiving bot may populate its own database table with the entity value and subsequently retrieve and access the value exclusively from its own database.

The above-described conversational AI framework essentially limits a user's interactions to the currently-active bot and its respective database tables with the exception of requested data that is passed into that bot at start-up or later retrieved via a complex database call to an externally-managed database table. Further, even if a bot is programmed with the capability of to query databases of other bots, the bot placing the query has no way of easily determining which bot(s) have recently defined entities that may be useful to interpreting a current conversation. If, for example, a user invokes a pizza-ordering bot five minutes after asking a weather bot about the weather in Seattle, the pizza-ordering bot does not have any way of knowing that the weather skill bot has recently acquired user location information.

In contrast to the above-described conversational AI systems that compartmentalize data in different memory spaces managed by different bots providing different AI skills, a human brain acts as a memory space that is available to all thought processes. Because all thought processes can access all data centers of the human brain, the human brain is capable of drawing inferences based on previous dialogs, such as those dialogs within previous conversations or previous dialogs (e.g., topics) discussed within the same conversation.

The herein disclosed technology provides a conversational AI framework for bot development that allows a bot to more naturally mimic human-realized inferences. The framework provides different bots with access to shared memory spaces that each implement data preservation policies based at least in part on the nature of the entities stored rather than merely the context in which the entities arise in conversation (e.g., a particular dialog).

Figure 1:
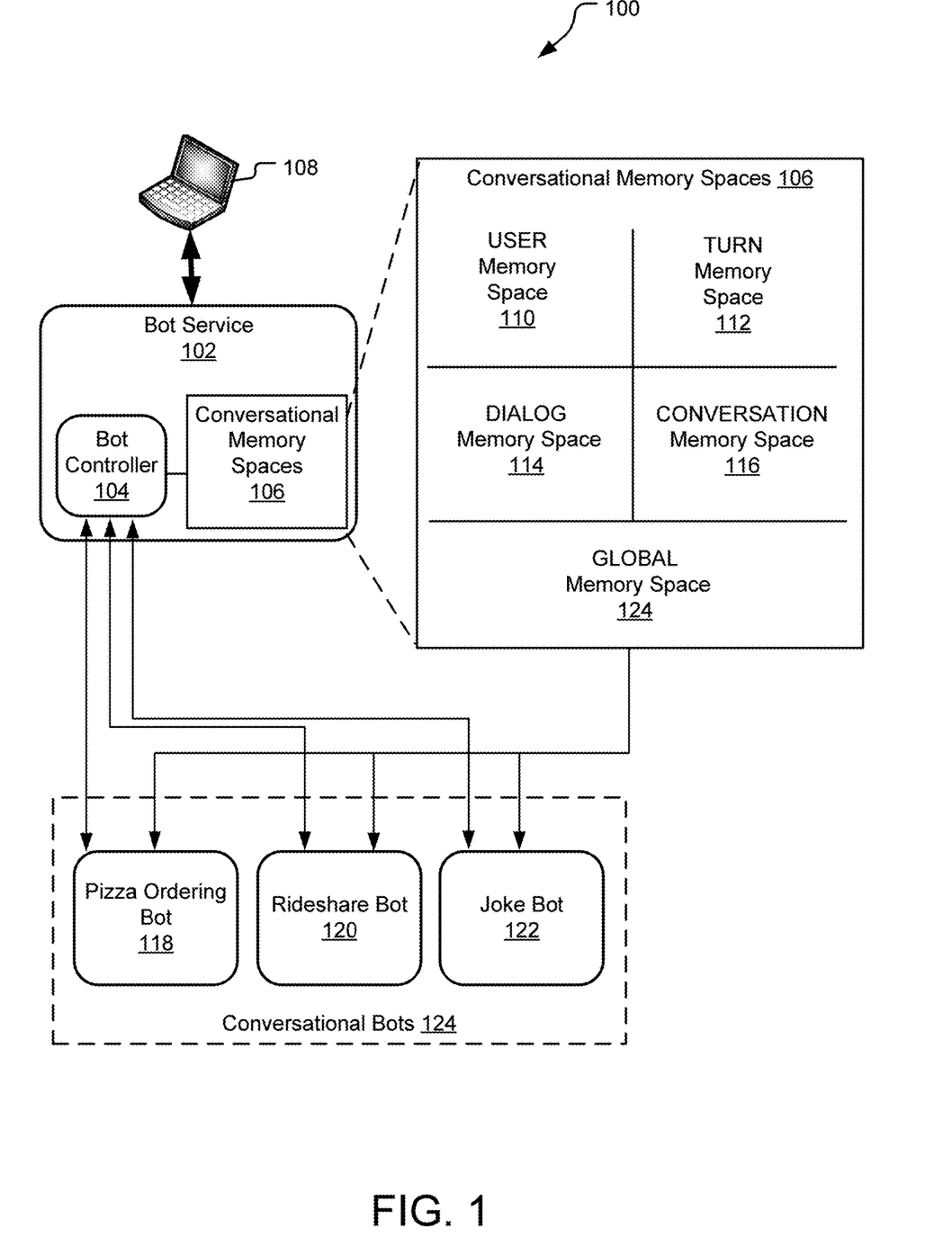
FIG. 1 illustrates n example conversational system that utilizes shared memory spaces governed by different policies for data lifecycle management.

FIG. 1 illustrates an example conversational system 100 that utilizes shared memory spaces governed by different scope policies for data lifecycle management. The conversational system 100 includes a conversational AI platform (e.g., a bot service 102) in operative communication with a user device 108. In various implementations, the user device 108 may assume a variety of forms including without limitation that of a mobile device, a laptop computer, a desktop computer, an Internet-of-Things (IoT) smart device (e.g., home voice assistant, a smart speaker), or any other computing device with which a user may interact. The user device 108 is in network communication with the bot service 102 via any suitable means including, for example, a local connection, a connection via a network interface, or the like. Alternatively, the bot service 102 may reside and be locally executable on the user device 108.

In one implementation, the bot service 102 includes a software development kit (SDK) that provides tools that allow developers to create bots (e.g., conversational bots 124) that may be capable of communicating across various channels (e.g., websites, applications) and devices (e.g., personal computers, mobile devices, home-based voice assistants). Each bot developed using the bot service 102 is designed to conduct either auditory or textual conversations with users.

The bot service 102 includes a bot controller 104, which may be understood as including software or a mix of hardware and software. The bot service 102 also maintains conversational memory spaces 106, which may be understood as including volatile memory, non-volatile memory, or a mix of volatile and non-volatile memory. Although the conversational memory spaces 106 are shown as part of the bot service 102, these spaces may, in some implementations, reside physically within memory of the user device 108 rather than a server of the bot service 102. In one implementation, the conversational memory spaces 106 consist of volatile memory that is loaded from local or remote non-volatile storage each time the host device (e.g., the user device 108 or a server of the bot service 102) is powered on.

The conversational memory spaces 106 may consist of a single computer-readable memory or on multiple different computer-readable memories of the same or different types. Although the exact number of storage spaces and nature of governing policies may differ from one implementation to another, FIG. 1 is shown to includes five discrete (non-overlapping) memory spaces that are used to store different types of data generated and collected during the course of a conversation. In various implementations, the different memory spaces within the conversational memory spaces 106 may represent either contiguous storage regions or non-contiguous storage regions.

Each one of the five memory spaces is associated with a defined storage location policy and a scope policy. The storage location policy govern the physical storage location of the memory space (e.g., a set of unique logical addresses) and the scope policy defines a set lifetime for data stored in the memory space. According to one implementation, the conversational memory spaces 106 and their respective storage location policies and scope policies are defined by the bot service 102 and are immutable by third-party developers that write bots using the bot service 102. In another implementation, third-party developers may optionally draft logical rules that provide for modifications to the storage location and/or scope policies designated by the bot service 102.

Although two or more of the different conversational memory spaces 106 may be governed by a same scope policy, it is contemplated that at least two or more of the conversational memory spaces 106 are governed by different scope policies. In FIG. 1, the conversational memory spaces 106 include a user memory space 110, a turn memory space 112, a dialog memory space 114, a conversation memory space 116, and a global memory space 124. Some of these spaces (e.g., Turn, Dialog, and Conversation) have a corresponding scope policy that defines a data lifetime mimicking a time period commonly associated with the conversational elements for which the space is named.

For example, the turn memory space 112 has a most ephemeral scope policy of the five spaces. According to one implementation, data stored in the turn memory space 112 is stored for the during of a "turn" in a conversation. A turn may be understand as a continuous time segment in which the bot service 102 and/or an active one of the conversational bots 124 processes a user utterance and responds to that utterance (e.g., by performing one or more actions and/or by responding verbally or textually to the user). If, for example, one of the conversational bots 124 recognizes an event or dialog that, in turn, triggers initiation of one or more steps, the event or dialog that is recognized may be stored temporarily as an object in the turn memory spaces. Once the turn ends (e.g., when the bot is finished processing the user's last utterance), values stored within the turn memory space 112 are cleared. As used herein, a user "utterance" may refer to either a spoken or written utterance.

The dialog memory space 114 is the second-most ephemeral space, implementing a scope policy that erases data at or responsive to an identified end of the dialog in which the data it stores is first created. As used herein, a dialog may be understood as referring to one or more consecutive communications with a bot (e.g., one of the conversational bots 124) pertaining to a particular topic. A conversation may have multiple dialogs. For example, a user may initiate a first dialog by asking about the weather and then initiate a second dialog by requesting help in booking a flight. Certain data that is deemed not relevant outside of the dialog (e.g., not specific to the user nor especially useful in potentially helping a bot to realize cross-dialog inferences) may be selectively stored in the dialog space and erased when the dialog ends or within some defined time period (e.g., 5 minutes) of the identified end of the dialog.

The conversation memory space 116 is, in contrast, a memory space implementing a scope policy that erases data at the end of the conversation in which the data it stores is created. As used herein, a conversation may be understood as referring to a sequence of consecutive communications between at least one user and at least one bot (e.g., one of the conversational bots 124) for which each consecutive communication is received within a set period of time relative to the prior communication. For example, the bot controller 104 may identify an "end" to an on-going conversation when there has been no user utterance for 15 minutes. Certain conversational data (e.g., of a type that a bot developer has pre-identified potentially relevant across multiple dialogs within a conversation) may be stored in the conversation memory space 116 and erased responsive to the identified end of the conversation.

In contrast to the above-described memory spaces, the user memory space 110 is, in one implementation, a persistent storage area used to store user-specific information that is independent of conversations in which the stored data arises. For example, the user memory space 119 may store one or more user names, user phone numbers, user preferences, etc. The global memory space 124 is, in contrast, a persistent storage area used to store information that is not user specific. For example, the global memory space 124 may store data indicating whether a home garage door is currently open or closed, the address of the home where the user device 108 resides, etc.

During the course of a conversation, one or more of the conversational bots 124 communicates with the user device 108 through the bot service 102. Each of the conversational bots 124 has uniform access to the conversational memory spaces 106 of the bot service 102, meaning that each one of the conversational bots 124 has the capability of reading information from and writing information to each of the conversational memory spaces 106 using the addressing scheme provided by the location storage policy for that memory space. The bot controller 104 performs actions for erasure of data within each of the conversational memory spaces 106 according to the associated scope policy. For example, the bot controller 104 cyclically erases data stored in the turn memory space 112 responsive to the end of each conversational turn, erases the data stored in the dialog memory space 114 responsive to the end of each dialog, and erases the data stored in the conversation memory space 116 responsive to the end of each conversation.

Notably, the conversational context in which various data entities are recognized and/or created does not necessarily govern the selection of the conversational memory space in which corresponding data is stored. For example, a user may provide personal data (e.g., a relative's name, a birthday, a password) during a dialog about a particular topic that arises in the course of a 10 minute conversation. During this dialog, the active bot (e.g., bot 118) may be programmed to store the personal data in the user memory space 110 rather than in the dialog memory space 114 or the conversation memory space 116. Likewise, certain data that the developer deems relevant across dialogs may be stored in the conversation memory space 116 so that it may be accessed during subsequent dialogs of the same conversation.

The memory space in which each generated entity is stored is, in one implementation, selected by the developer of the bot that creates the data. For example, the conversational bots 124 may each execute "recognizers" implementing logic designed to catch and recognize certain "intents" (e.g., user wants to hear a joke; user wants to plan a trip) and to emit events that trigger rules for responding to the detected intents. Each generated data object (e.g., the recognized intent, emitted event, objects created during the execution of rules) is stored in a select one of the conversational memory spaces 106 that is specified by the developer within logic of the bot.

By example and without limitation, the conversation bots 124 are shown to include a pizza ordering bot 118, a rideshare bot 120, and joke bot 122. Each of these bots may be understood as being potentially written by a different third-party developer independent of the bot service 102. To provide the conversational bots 124 with access to the conversational memory spaces 106, the third-party developer does not need to know the storage location policy for each of the memory spaces. For example, the developer does not have to write code to request information from another one of the conversational bots 124 or to query an externally-managed database (e.g., to place a MySQL query).

In one implementation, each of the conversational memory spaces 106 is accessible through a conversational data object that is defined by the bot service 102. The conversational data object includes multiple sub-objects that each correspond to one of the conversational memory spaces (e.g., a user data sub-object, a turn data sub-object, a dialog data sub-object, a conversation data sub-object, and a global data sub-object). By using this schema defined by the bot service, a bot developer can write code to enable each to read to and write from the conversational memory spaces 106 within knowing the exact physical locations of those memory spaces.

Because the different conversational bots 124 all have uniform access to the conversational memory spaces 106 of the bot service 102, information can be readily shared and utilized across different bots without direct communications between the bots and without calls to externally-managed databases. In the example of FIG. 1, the pizza ordering bot 118 is, for example, a bot that allows the user to order a pizza; the rideshare bot 120 is, for example, a bot that allows the user to a call a taxi (e.g., Uber or Lyft); and the joke bot 122 is, for example, a bot that tells various jokes. As may be appreciated, there may exist hundreds or thousands of other bots designed to interact with the user device 108 through the bot service 102. Since each of the conversational bots 124 has uniform read and write access to the conversational memory spaces 106, data stored in the memory spaces is mutually accessible by all of the conversational bots 124, regardless of which bot created the data. This has the effect of simplifying both the complexity of code drafted to implement a bot and also enhances the bot's ability to more accurately and seamlessly complete user-requested tasks within the framework of a complex, multi-dialog conversation.

If, for example, the user says: "I'd like to order a pizza," the bot controller 104 may invoke the pizza ordering bot 118 to create data representing the pizza order and to perform actions for placing the order. In this example, the pizza ordering bot 118 collects various information from the user including the user's current location (e.g., to find the nearest pizza place), the size of the pizza requested, and the desired pizza toppings. Here, the pizza ordering bot 118 may store the pizza size and toppings in the dialog memory space 114 while storing other information, such as the user's current location (e.g., home) and/or the address of the pizza place in the conversation memory space 116.

After the order is placed, the bot service 102 identifies an end to the dialog (e.g., via a cue from the pizza ordering bot 118, a user's initiation of a new user dialog, an elapsed period of time with no recognized actively, etc.). Responsive to identification of the end of the dialog, the bot service 102 erases all of the data stored in the dialog memory space 114. If the user continues the conversation by making another request, data in the conversation memory space 116 is preserved. If, for example, the user says: "I'd like to call a taxi," the bot service 102 may invoke the rideshare bot 120 to arrange a taxi pickup for the user. Rather than ask the user for a pick-up address and drop-off address, the rideshare bot 120 may instead access the data in the conversation memory space 116 and see that the user's "current location" is set to home and that a most-recently-used (MRU) address is for Domino's pizza on 1234 Main Street. In this scenario, the rideshare bot 120 may say "are you still at home?" and "do you want to go to the Domino's where you just ordered the pizza?" Using this information, the rideshare skill 120 can then call the taxi to pick-up the user at home and drive the user to Domino's, without requesting significant information from the user.

Figure 2:
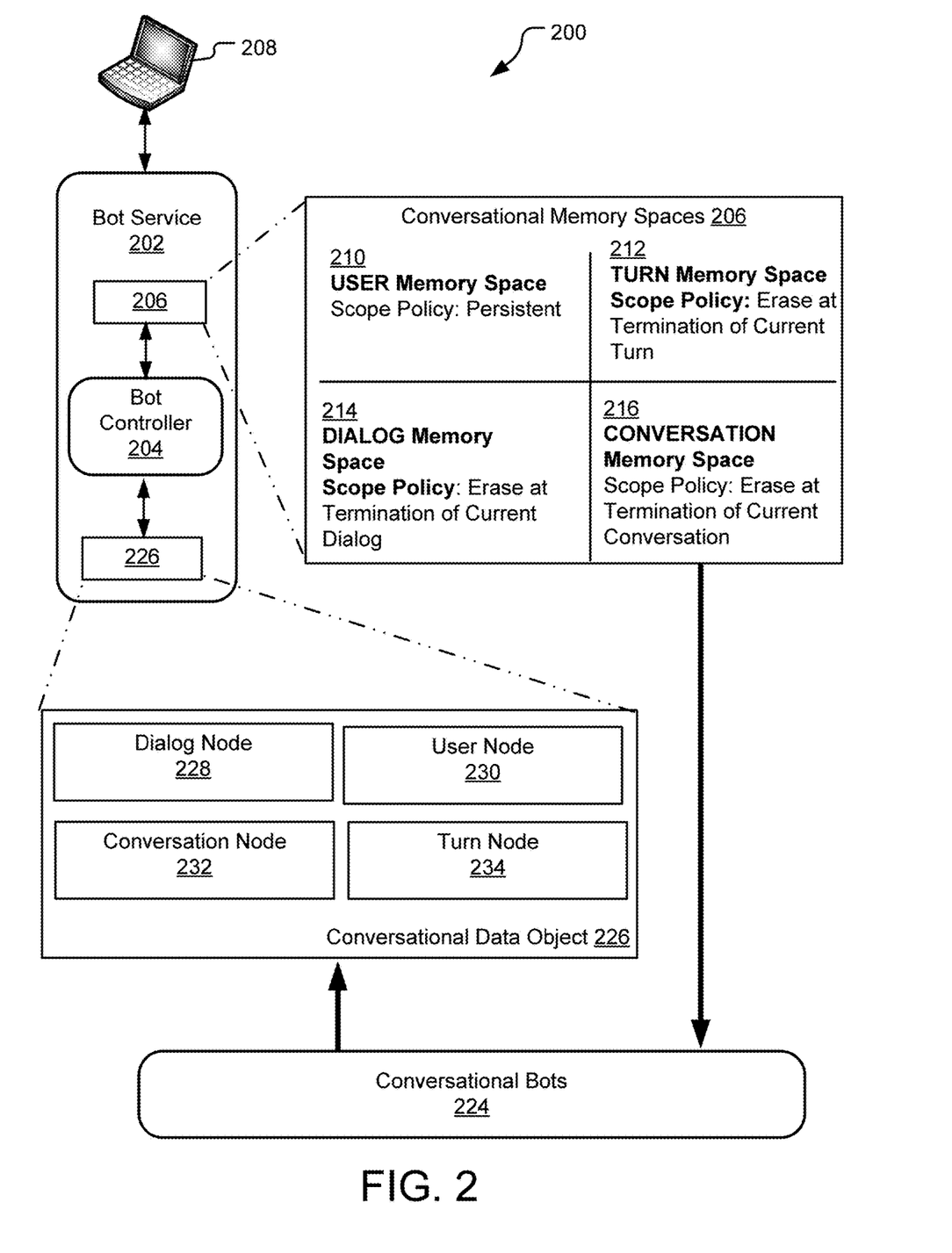
FIG. 2 illustrates another example conversational system that utilizes shared memory spaces governed by different policies for data lifecycle management.

FIG. 2 illustrates another example conversational system 200 that provides bots with shared memory spaces having different scope policies for data lifecycle management. The conversational system 200 includes a bot service 202 that provides an interface between various conversational bots 224 and a user device 208.

The bot service 202 includes a bot controller 204 that manages conversational memory spaces 206 shared by the various conversational bots 224 interacting with the user device. Although the conversational memory spaces 206 are shown to be part of the bot service 202, some or all of these spaces may be stored locally on the user device 208. Although the conversational memory spaces 206 may, in other implementations, implement other numbers of memory spaces, FIG. 2 shows four exemplary memory spaces including a user memory space 210, a turn memory space 212, a dialog memory space 214, and a conversation memory space 216. Each of the conversational memory spaces 206 is governed by an associated storage location policy and a scope policy defined by the bot service 202. The storage location policy governs the physical storage location of the memory space (e.g., a set of unique logical addresses) and the scope policy defines a set lifetime for data stored in the memory space.

By example and without limitation, the user memory space 210 is shown to have a "persistent" scope policy meaning that data is retained indefinitely or until deletion is requested by a particular bot. The turn memory space 212, in contrast, is managed according to a scope policy providing that the associated data is to be erased at the termination of each turn (e.g., wherein the bot service 202 and/or an associated one of the conversational bots 224 processes and responds to a user utterance). The dialog memory space 214 is managed according to a scope policy providing that the associated data is to be erased responsive to the end of each dialog, and the conversation memory space has a scope policy providing that the associated data is to be erased responsive to an identified termination of the conversation in which the data was generated.

Although the various conversational bots 224 may selectively erase and/or overwrite certain data in the conversational memory spaces 206 (e.g., by way of a command to the bot service 202), the bot controller 204 implements the scope policy for each of the conversational memory spaces 206 on an on-going basis by erasing data within the memory space at end of each cycle defined by the scope policy of the memory space (note—in this example, the data in the user memory space 210 is preserved for an indefinite cycle without end). For example, the bot controller 204 erases all data in the turn memory space 212 each time an "end turn" activity is processed (e.g., after the bot controller 204 is finished processing a user utterance); erases all data in the dialog memory space 214 responsive to an identified "end of dialog" event (e.g., when the user commences a new dialog relating to a different topic); and erases all dialog in the conversation memory space 216 responsive to an identified end of a conversation (e.g., after a set period of time has elapsed since the last user utterance was detected).

The bot controller 204 provides a schema that may be utilized by each of the conversational bots 224 to read data from and write data to the conversational memory spaces 206. In one implementation, this schema includes a conversational data object 226 that holds all data generated during the course of a single conversation between one or more users of the user device 208 and one or more conversational bots 224. Although the conversational data object 226 may assume a variety of shapes and forms in different implementations, the conversational data object 226 is, in one implementation, a single JSON object.

The conversational data object 226 defines a number of sub-objects, also referred to herein as nodes. Each of the sub-objects (nodes) provides the conversational bots 224 with uniform and direct access to a corresponding one of the conversational memory spaces 206. In FIG. 2, the conversational data object 226 includes a user node 230 that provides the conversational bots 224 with access to the user memory space 210; a dialog node 228 that provides the conversational bots 224 with access to the dialog memory space 214; a turn node 234 that provides the conversational bots 224 with access to the turn memory space 212; and a conversation node 232 that provides the conversational bots 224 with access to the conversation memory space 216. Note, some implementations may further implement a global node for accessing a global memory space (e.g., as described with respect to FIG. 1) or one or more other nodes of the conversational data object 226 to access still other memory spaces not described herein.

During a conversation with a user interacting with the user device 208, a bot (e.g., one of the conversational bots 224) executes logic to recognize events that may trigger one or more rules that implement steps allowing the bot to respond to the recognized events. Each recognized event is associated, within computer-executable code of the bot, with a designated one of the nodes of the conversational data object 226. For example, a bot developer may write code to catch an event in which the user provides his or her name and to store the name in the user node 230 (e.g., via code such as "coversationobject.user.name={$String}" where "conversationobject" is the universal name for the conversational data object 226, "user" is the name of the user node, and "$String" is the user-provided name). The bot controller 204 then stores this new data of the user node 230 in the user memory space 210 and any one of the conversational bots 224 can subsequently access this data by requesting the value of the object "conversationobject.user.name."

In one implementation, the various conversational bots 224 are able to create complex sub-objects within each one of the nodes (e.g., 228, 230, 232, and 234). For example, a pizza-ordering bot (e.g., the pizza-ordering bot 118 of FIG. 1) may create a sub-object within the dialog node 228 called "pizzaorder." For example, the bot may, throughout the course of the conversation, create a "pizzaorder" sub-object within the dialog node 228 and populate the object with the following information:

```
"pizza order"
{
    "size": "large"
    "toppings": ["pepperoni", "extra cheese", "green peppers"]
    "deliveryaddress" : "1234 Main Street"
}
```

Notably, this methodology allows each of the conversational bots 224 to create objects within a shared memory space that that have complex attributes of any form (e.g., array, string, integer, float).

In one implementation, the conversational data object 226 may be predefined to immutably define certain sub-objects and/or attributes within the nodes that are populated one or more times throughout interactions between the conversational bots 224 and the user. For example, the user node 230 may initially include a null list of user-related attributes (e.g., user name, user address, user phone number) that are populated by one or more of the conversational bots 224 as the corresponding information is learned. In one implementation, one or more of the nodes of the conversational data object 226 includes several defined "most-recently-used" attributes (MRUs) that are expected to be re-populated many times over. For example, the conversation node 232 may include MRUs that may be potentially updated and changed multiple times within the course of a conversation, including attributes such as lastMaleReference, lastFemaleReference, lastLocationReference, etc. Predefining placeholders for these attributes within the schema of the conversational data object 226 of may simplify the cross-sharing of frequently-used information between different bots interacting with the user during a same conversation. For example, a pizza ordering bot may place define the user's delivery address in the conversation node 232 and a weather bot may, later in the same conversation, query the conversation node 232 for this attribute (e.g., "conversationobject.conversation.lastLocationReference") to obtain the user's current location.

By managing/erasing data stored of the conversational memory spaces 206 according to each associated scope policy, the bot service 202 simplifies work that may otherwise need to be encoded by a bot developer. For example, a dialog event may be generated and placed in the turn memory space 212 each time a user utterance is detected. Likewise, a recognition result may be placed in the dialog space when the dialog event (or other event) is recognized. Since the bot service 202 erases the dialog memory space 214 at the end of each turn (e.g., after the bot has recognized, processed, and responded to a given user utterance), these attributes do not need to be wiped by the bot that created them, allowing the same attributes to be populated over and over without clean-up or error on the part of the bot.

Components of the conversational system 200 not specifically described with respect to FIG. 2 may be understood as capable of performing the same or similar functions via the same or similar principles as those described within respect to other implementations described herein.

Figure 3:
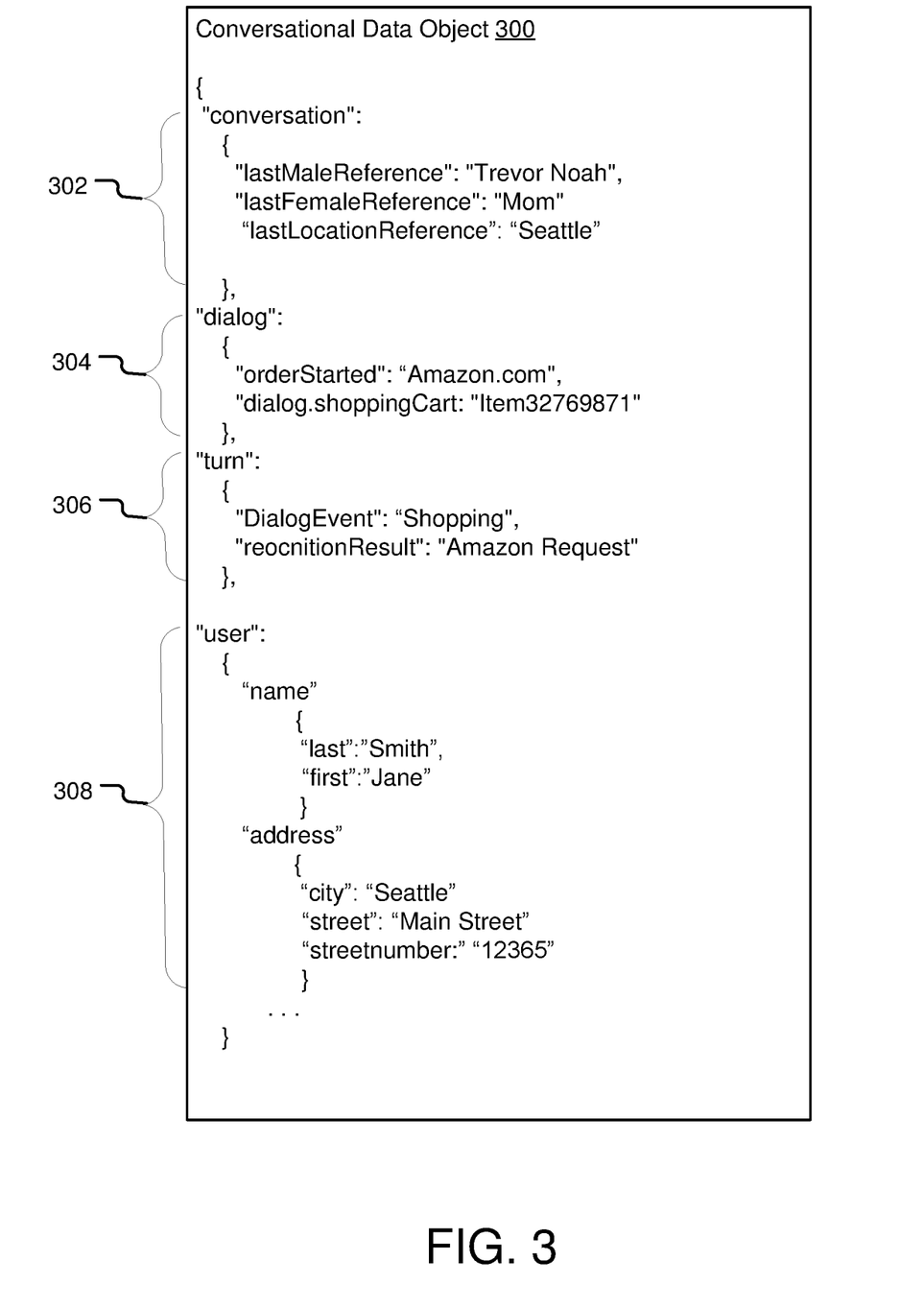
FIG. 3 illustrates an example conversational data object that stores conversational data collected by one or more bots conversing with a user through a user device.

FIG. 3 illustrates an example conversational data object 300 that stores conversational data collected by one or more bots conversing with a user through a particular user device. According to one implementation, the conversational data object 300 is defined within a schema of a centralized bot service that provides third-party-developed bots with uniform access to a number of shared memory spaces. In the example shown, the conversational data object 300 includes four primary nodes (sub-objects) including a conversation node 302, a dialog node 304, a turn node 306, and a user node 308. Although not shown, the conversational data object 300 may implement one or more other nodes as well, such as a global node (not shown). Each of these primary nodes includes one or more sub-objects and/or corresponding sub-object attributes that have been selectively populated and/or created by one or more bots while conducting conversation(s) with a user through a user device. In one implementation, the conversational data object 300 is a full or partial representation of the conversational data object 226 of FIG. 2.

During a conversation with a user, a bot service acts as an intermediary between a bot and the user device. The bot provides the bot service with instructions to populate various sub-objects and entities of the turn node 306, dialog node 304, conversation node 302, and user node 308 with conversational data obtained from a user. For example, each write command from the bot may designate a select node (e.g., of the turn node 306, dialog node 304, conversation node 302, and user node 308) for storing conversational data specified by the command. Upon receipt of each storage command from the bot, the bot service stores the associated received data within a select one of the conversational memory spaces corresponding to the designated node. For example the conversational memory spaces may be the same or similar to those exemplary memory spaces shown in FIG. 1 or FIG. 2.

According to one implementation, each of the different memory spaces is governed by a storage location policy (e.g., specifying the address range of the memory space) and a scope policy that specifies a lifetime for data stored in the memory space. The bot service performs actions for storing received conversational data in the memory space associated with the designated node and also performs actions to carry out the scope policy for the memory space associated with the designated node, such as by cyclically erasing data at intervals corresponding to the lifetime defined by the governing scope policy.

According to one implementation, the user node 308 stores user data that is scoped to an ID of the user that is conversing with a bot. Examples in FIG. 2 include objects "name" and "address", which are both complex objects. In one implementation, the bot service stores data directed to the user node 308 within a "user" memory space governed by a persistent scope policy, meaning data is retained indefinitely in the absence of specific instructions to erase from a bot.

In the same or another implementation, the bot service stores data directed to the turn node 306 within an allocated "turn" memory space governed by a scope policy providing for erasure of the data stored therein responsive to generation of each "end turn" event. Turn data may include, for example, recognized intents and events emitted responsive to recognized intents. In the example of FIG. 3, the turn node 306 is shown to include a recognition result "Amazon Request" (e.g., the user has said, "I want to buy mom a birthday gift on Amazon") and a corresponding dialog event "shopping" that has been generated in response the recognition result. Following generation of the data shown in the turn node 306, the bot may respond to the user with a suitable response (e.g., "sure, what would you like to order?") and generate an "end turn" event signifying that it is finished processing and responding to the user's last utterance. Responsive to the end turn event, the bot service erases data stored in the turn memory space, essentially deleting values for all entities and events stored within the turn node 306.

In the same or another implementation, the bot service stores data written to the dialog node 304 in a dialog memory space governed by a scope policy providing for erasure of data stored therein responsive to an identified end of each dialog. In FIG. 3, the dialog node 304 is shown to include entities indicating where the user has initiated an order (e.g., Amazon.com) and an ID corresponding to an item the user has requested for purchase. In differently implementations, various events may trigger termination of this exemplary dialog including, for example, completion of the shopping order, user initiation of a new dialog, or an event triggering end of the conversation (e.g., a prolonged user silence). Responsive to the identified termination of the dialog, the bot service erases data stored in the dialog memory space, essentially deleting values of the various entities and attributes within the dialog node 304.

In the same or another implementation, the bot service stores data written to the conversation node 302 in a conversation memory space governed by a scope policy providing for erasure of the data responsive to an identified end of a conversation. In general, the conversation node 302 may be utilized to store data that is deemed relevant to the conversation independent of dialog. In FIG. 3, the conversation node 302 is shown to include a number of exemplary most-recently-used entity values. For example, an entity "lastFemaleReference" is populated to "Mom" (e.g., when the user says: "I want to buy Mom a birthday gift on Amazon") and another entity, "lastLocationReference," is populated to "Seattle" when the user provides a shipping address for the shopping order. In FIG. 3, the conversation node 302 includes a third exemplary entity "lastMaleReference," which is shown populated with "Trevor Noah." For example, this value may be populated during a dialog that occurred either before or after the shopping dialog within the course of the same conversation.

The values defined within the conversation node 302 persistent across different dialogs within the same conversation, making them available to all active bots interacting with a user during an on-going conversation. In differently implementations, various different events may trigger termination of the conversation. In one implementation, the bot service identifies the conversation as "terminated" when a set period of time elapses without detection of a user utterance. Responsive to termination of the conversation, the bot service erases data stored in the conversation memory space, essentially deleting values of the entities and attributes defined within the conversation node 302.

Notably, the above-described system may provide a bot with access to two or more of the different memory spaces using a single query. For example, a developer may write a single line of code executable to request data from the conversation memory space (e.g., conversation.lastLocationReference) and also from the user memory space (e.g., user.streetnumber, user.street, and/or user.city). This use of the different nodes 302, 304, 306, and 308 of the conversational data object 300 to provide the user with access to the different corresponding memory spaces therefore significantly reduces the complexity of coding, since there is no need to query multiple external databases via one or more complex queries.

Figure 4:
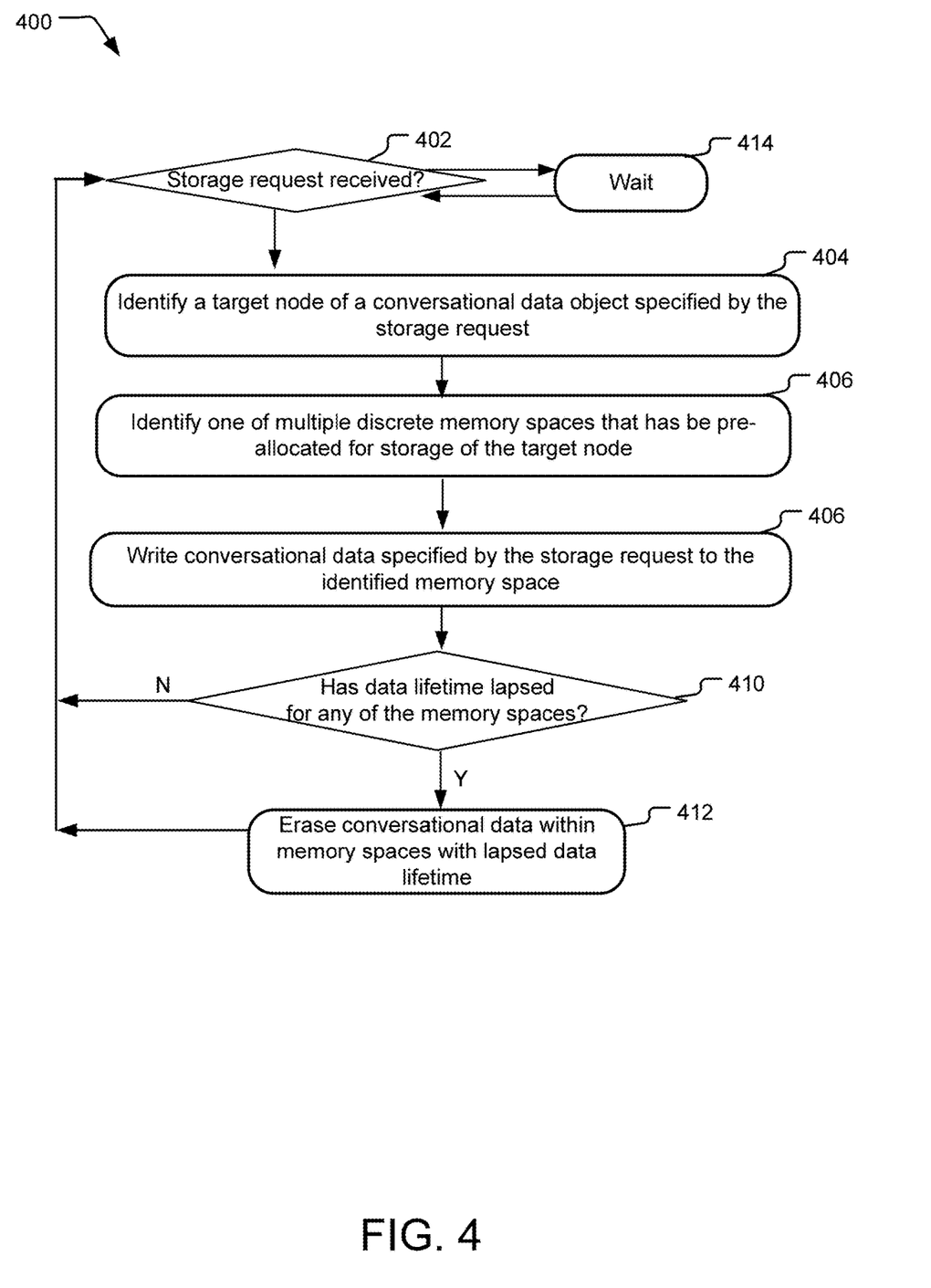
FIG. 4 illustrates example operations for using shared memory spaces for data lifecycle management within a conversational AI system.

FIG. 4 illustrates example operations 400 for using shared memory spaces for data lifecycle management within a conversational AI system. A determination operation 402 executed by a bot service determines whether a conversational data storage request has been received from a third-party developed bot. If not, a waiting operation 414 is resumed until a next conversational data request is received.

Responsive to determining that a storage request has been received, an identification operation 404 identifies a target node (sub-object) for the conversational data within a conversational data object that the bot service uses to store all data of a conversation conducted with one or more users through a user device. Each node of the conversational data object is pre-associated (e.g., by the bot service) with a corresponding one of multiple discrete memory spaces that is reserved for storage of the target node. According to one implementation, each conversational data storage request received by the bot service specifies both conversational data for storage as well as the target node of a conversational data object.

Another identification operation 406 identifies the memory space that has been pre-allocated for storage of target node, and a storage operation 408 then writes the received conversational data to the identified memory space.

According to one implementation, state data within each of the multiple discrete memory spaces has a set lifetime defined in a scope policy associated with the memory space that is implemented by the bot service. An evaluation operation 410 evaluates the data lifetime specified by the scope policy for each of the multiple discrete memory spaces and, for each of the multiple discrete memory spaces, determines whether the set lifetime for the memory space has expired since data was last written to the memory space. If there exist one or more memory spaces for which the associated set lifetime has expired, an erasing operation 412 erases data of those memory spaces—essentially clearing the associated node of entities and attributes populated by the third-party bot. The determination operation 402 determines whether a next storage request is received, and the operations 400 are repeated.

Figure 5:
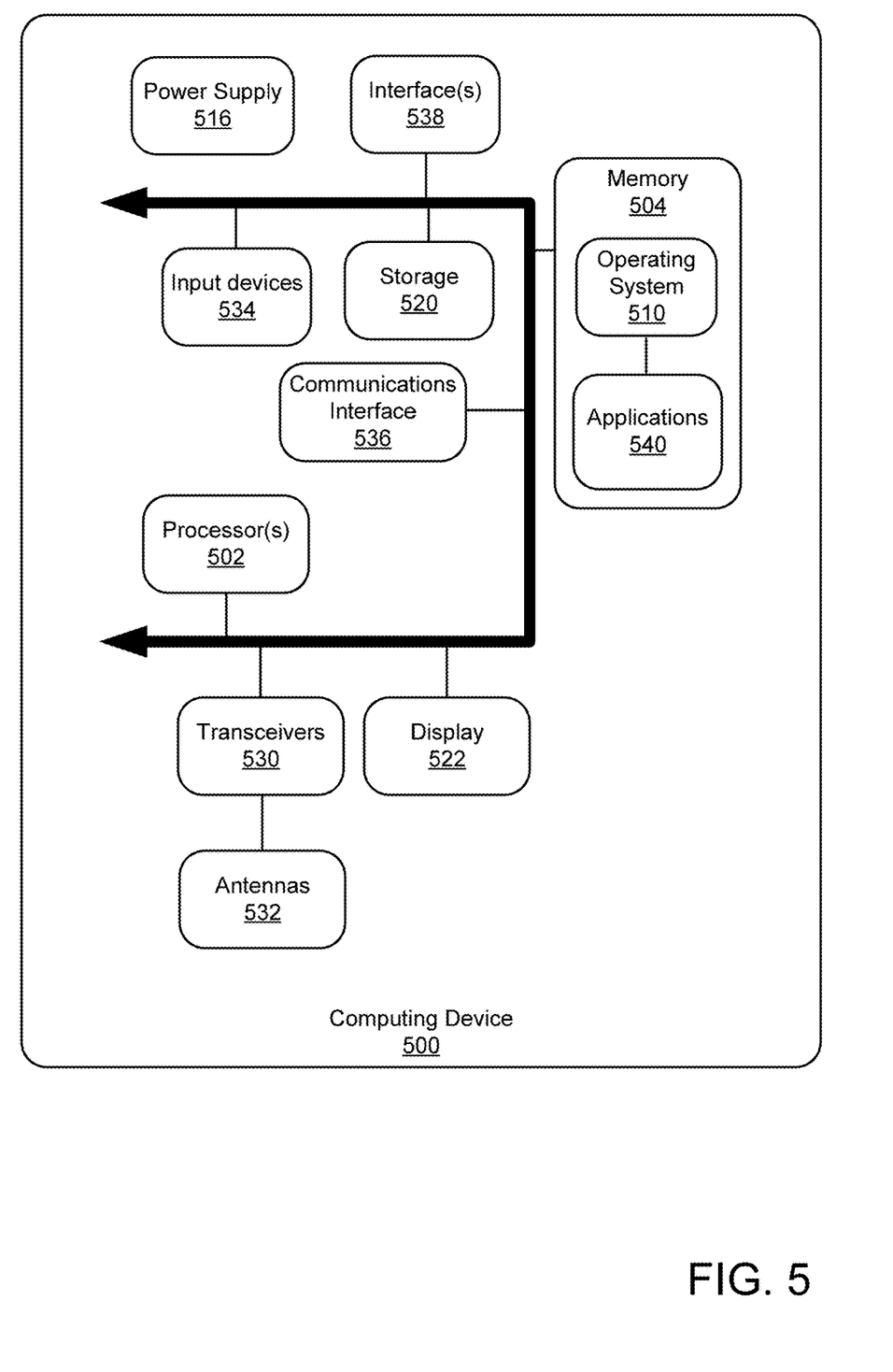
FIG. 5 illustrates an example schematic of a processing device that may be suitable for implementing aspects of the disclosed technology.

FIG. 5 illustrates an example schematic of a processing device 500 that may be suitable for implementing aspects of the disclosed technology. The processing device 500 includes one or more processor(s) 502, memory 504, a display 526, and other interfaces 538 (e.g., buttons). The memory 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, resides in the memory 504 and is executed by the processor unit(s) 502, although it should be understood that other operating systems may be employed.

One or more applications 540 (e.g., such as the bot service 102 or various conversational bots 124 of FIG. 1) are loaded in the memory 504 and executed on the operating system 510 by the processor unit(s) 502.

Applications 540 may receive input from various input local devices (not shown) such as a microphone, keypad, mouse, stylus, touchpad, joystick, etc. Additionally, the applications 540 may receive input from one or more remote devices, such as remotely-located smart devices, by communicating with such devices over a wired or wireless network using more communication transceivers 530 and an antenna 532 to provide network connectivity (e.g., a mobile phone network, Wi-Fi®, Bluetooth®).

The processing device 500 further includes storage device 520 and a power supply 516, which is powered by one or more batteries and/or other power sources and which provides power to other components of the processing device 500. The power supply 516 may also be connected to an external power source (not shown) that overrides or recharges the built-in batteries or other power sources.

In an example implementation, a bot service and/or one or more bots include hardware and/or software embodied by instructions stored in the memory 504 and/or storage devices 520 and processed by the processor unit(s) 502. The memory 504 may also include shared memory spaces (e.g., volatile memory of a user device or bot service) that is uniformly accessible to multiple bots conducting aspects of a conversation with a user through a user device.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example system disclosed herein includes a bot service stored in memory and executable to receive one or more storage requests directing conversational data to multiple nodes of a conversational data object. The conversational data is collected by one or more third-party bots during a conversation with a user conducted through a user device. The bot service executes the one or more storage requests by storing the conversational data directed to each different one of the multiple nodes within a different one of multiple discrete memory spaces where each memory space of the multiple discrete memory spaces is governed by a different scope policy defining a lifetime for conversational data stored within the memory space. The bot service also selectively erases data of each node of the multiple nodes of the conversational data object according to the lifetime defined by the scope policy governing the memory space storing the node.

In one example system according to any proceeding system, at least one of the multiple discrete memory spaces is governed by a scope policy that provides for erasing the conversational data stored in the memory space responsive to an end of each speaking turn within the conversation.

In another example system according to any preceding system, at least one of the multiple discrete memory spaces is governed by a scope policy that provides for cyclically erasing the conversational data stored in the memory space responsive to an end of each dialog within the conversation.

In yet another example system according to any preceding system, at least one of the multiple discrete memory spaces is governed by a scope policy that provides for erasing the conversational data stored in the memory space responsive to an end of the conversation.

In still another example system of any preceding system, at least one of the multiple discrete memory spaces is governed by a scope policy that provides for persistent storage of the conversational data.

In still another example system of any preceding system, each of the multiple discrete memory spaces is a region of volatile memory uniformly accessible to the one or more third-party bots.

In yet still another example system of any preceding system, the bot service executes the one or more storage requests by creating a complex sub-object within one or more of the multiple nodes of the conversational data object.

In still another example system of any preceding system, the scope policy for each of the multiple discrete memory spaces is defined by the bot service.

An example method disclosed herein comprises receiving one or more storage requests directing conversational data to multiple nodes of a conversational data object and storing the conversational data directed to each different one of the multiple nodes within a different one of multiple discrete memory spaces. The conversational data is collected by one or more third-party bots during a conversation with a user conducted through a user device, and each of the multiple discrete memory spaces is governed by a scope policy defining a lifetime for data stored within the memory space. The method further comprises selectively erasing data of each node of the multiple nodes of the conversational data object according to the lifetime defined by the scope policy governing the memory space storing the node.

In one example method according to any preceding method, at least one of the multiple discrete memory spaces is governed by a scope policy that provides for erasing the conversational data stored in the memory space responsive to an end of each speaking turn within the conversation.

In another example method of any preceding method, at least one of the multiple discrete memory spaces is governed by a scope policy that provides for cyclically erasing the conversational data stored in the memory space responsive to an end of each dialog within the conversation.

In still another example method of any preceding method, at least one of the multiple discrete memory spaces is governed by a scope policy that provides for erasing the conversational data stored in the memory space responsive to an end of the conversation.

In yet still another example method of any preceding method, at least one of the multiple discrete memory spaces is governed by scope policy that provides for persistent storage of the conversational data.

In still another example method of any preceding method, each of the multiple discrete memory spaces is a region of volatile memory uniformly accessible to the one or more third-party bots.

In still another example method of any preceding method, storing the conversational data further comprises creating a complex sub-object within one or more of the multiple nodes of the conversational data object.

In still another example method of any preceding method, the scope policy for each of the multiple discrete memory spaces is defined by a bot service.

An example memory device implements computer-executable instructions for executing a computer process that comprises receiving one or more storage requests directing conversational data to multiple nodes of a conversational data object and storing the conversational data directed to each different one of the multiple nodes within a different one of multiple discrete memory spaces. The conversational data is collected by one or more third-party bots during a conversation with a user conducted through a user device, and each memory space of the multiple discrete memory spaces is governed by a scope policy defining a lifetime for data stored within the memory space. The computer process further comprises selectively erasing data of each node of the multiple nodes of the conversational data object according to the lifetime defined by the scope policy governing the memory space storing the node.

In an example computer process according to any preceding computer process, at least one of the multiple discrete memory spaces is governed by a scope policy that provides for cyclically erasing data responsive to an end of each speaking turn within the conversation.

In another example computer process according to any preceding computer process, at least one of the multiple discrete memory spaces is governed by a scope policy that provides for cyclically erasing data responsive to an end of each dialog within the conversation.

In yet still another example computer process according to any preceding computer process, at least one of the multiple discrete memory spaces is governed by a scope policy that provides for erasing data responsive to an end of the conversation.

An example system disclosed herein includes a means for receiving one or more storage requests directing conversational data to multiple nodes of a conversational data object and a means for storing the conversational data directed to each different one of the multiple nodes within a different one of multiple discrete memory spaces. The conversational data is collected by one or more third-party bots during a conversation with a user conducted through a user device, and each of the multiple discrete memory spaces is governed by a scope policy defining a lifetime for data stored within the memory space. The system further comprises a means for selectively erasing data of each node of the multiple nodes of the conversational data object according to the lifetime defined by the scope policy governing the memory space storing the node.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A conversational AI system comprising:
    a bot service stored in memory and executable to:
        receive one or more storage requests directing conversational data to multiple nodes of a conversational data object, the conversational data being collected by one or more third-party bots during a conversation with a user conducted through a user device;
        execute the one or more storage requests by storing the conversational data directed to each different one of the multiple nodes within a different one of multiple discrete memory spaces, each memory space of the multiple discrete memory spaces being governed by a different scope policy defining a lifetime for conversational data stored within the memory space; and
    selectively erase data of each node of the multiple nodes of the conversational data object according to the lifetime defined by the scope policy governing the memory space storing the node, the scope policy of the memory space providing for erasure of the conversational data within the memory space responsive to at least one of:
    an end of each speaking turn within the conversation;
    an end of each dialog within the conversation; and
    an end of the conversation.

2. The conversational AI system of claim 1, wherein at least one of the multiple discrete memory spaces is governed by a scope policy that provides for persistent storage of the conversational data.

3. The conversational AI system of claim 1, wherein each of the multiple discrete memory spaces is a region of volatile memory uniformly accessible to the one or more third-party bots.

4. The conversational AI system of claim 1, wherein the bot service executes the one or more storage requests by creating a complex sub-object within one or more of the multiple nodes of the conversational data object.

5. The conversational AI system of claim 1, wherein the scope policy for each of the multiple discrete memory spaces is defined by the bot service.

6. A method comprising:
    receiving one or more storage requests directing conversational data to multiple nodes of a conversational data object, the conversational data being collected by one or more third-party bots during a conversation with a user conducted through a user device;
    storing the conversational data directed to each different one of the multiple nodes within a different one of multiple discrete memory spaces, each of the multiple discrete memory spaces being governed by a scope policy defining a lifetime for data stored within the memory space; and
    selectively erasing data of each node of the multiple nodes of the conversational data object according to the lifetime defined by the scope policy governing the memory space storing the node, the scope policy of the memory space providing for erasure of the conversational data within the memory space responsive to at least one of:
    an end of each speaking turn within the conversation;
    an end of each dialog within the conversation; and
    an end of the conversation.

7. The method of claim 6, wherein at least one of the multiple discrete memory spaces is governed by scope policy that provides for persistent storage of the conversational data.

8. The method of claim 6, wherein each of the multiple discrete memory spaces is a region of volatile memory uniformly accessible to the one or more third-party bots.

9. The method of claim 6, wherein storing the conversational data further comprises creating a complex sub-object within one or more of the multiple nodes of the conversational data object.

10. The method of claim 6, wherein the scope policy for each of the multiple discrete memory spaces is defined by a bot service.

11. One or more memory devices implementing computer-executable instructions for executing a computer process comprising:
 receiving one or more storage requests directing conversational data to multiple nodes of a conversational data object, the conversational data being collected by one or more third-party bots during a conversation with a user conducted through a user device;
 storing the conversational data directed to each different one of the multiple nodes within a different one of multiple discrete memory spaces, each memory space of the multiple discrete memory spaces being governed by a scope policy defining a lifetime for data stored within the memory space; and
 selectively erasing data of each node of the multiple nodes of the conversational data object according to the lifetime defined by the scope policy governing the memory space storing the node, the scope policy of the memory space providing for erasure of the conversational data within the memory space responsive to at least one of:
 an end of each speaking turn within the conversation;
 an end of each dialog within the conversation; and
 an end of the conversation.

12. The conversational AI system of claim 1, wherein at least one of the multiple discrete memory spaces is governed by a scope policy that provides for erasing the conversational data stored in the memory space responsive to an end defined by the scope policy.

13. The method of claim 6, wherein at least one of the multiple discrete memory spaces is governed by a scope policy that provides for erasing the conversational data stored in the memory space responsive to an end defined by the scope policy.

14. The one or more memory devices of claim 11, wherein at least one of the multiple discrete memory spaces is governed by a scope policy that provides for erasing the conversational data stored in the memory space responsive to an end defined by the scope policy.

\* \* \* \* \*